Nov. 2, 1954
M. E. NELSON
2,693,371
SHORT FLEXIBLE COUPLING
Filed June 16, 1952
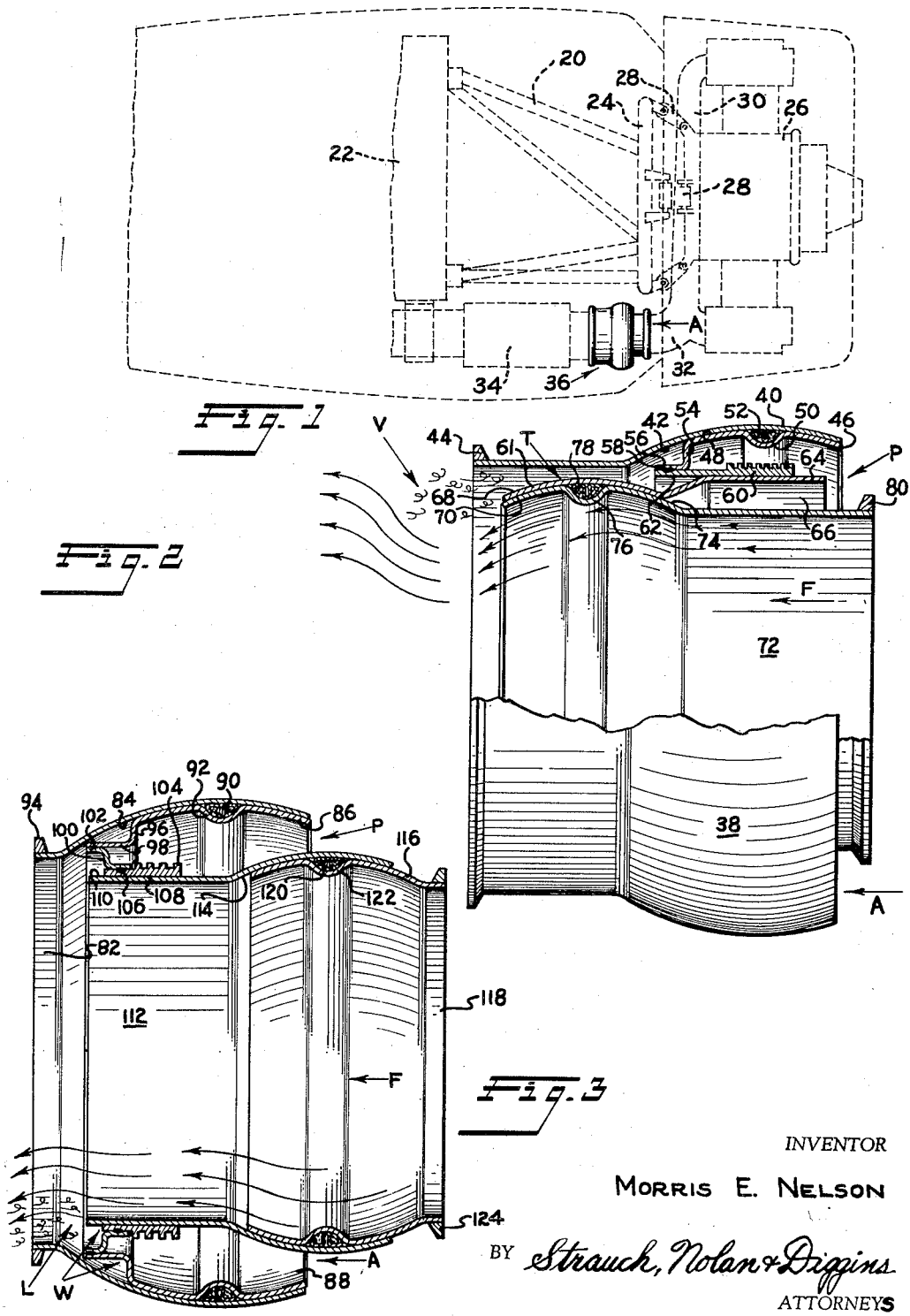
INVENTOR
MORRIS E. NELSON
BY *Strauch, Nolan & Diggins*
ATTORNEYS

United States Patent Office 2,693,371
Patented Nov. 2, 1954

2,693,371

SHORT FLEXIBLE COUPLING

Morris E. Nelson, San Diego, Calif., assignor to Solar Aircraft Company, San Diego, Calif., a corporation of California Application June 16, 1952, Serial No. 293,740

14 Claims. (Cl. 285—11)

This invention relates to flexible couplings for carrying a fluid between two members subject to relative angular and axial movement and more particularly to a short length multi-action coupling for use in various fluid lines of aircraft engines, jet engines, and other applications where the space limitations are critical, the fluid to be carried is usually at high temperatures and high pressures and of a corrosive nature, and there is a need for reliable continuous operation.

Flexible couplings heretofore known such as those disclosed by Rohr U. S. Patent 2,502,753 and Patterson U. S. Patent 2,556,659 have not fully met the need of a short coupling having multi-action flexibility. Both Rohr and Patterson disclose a universal joint coupling having spaced ball and socket connectors which are completely independent in their respective movements, such structures have a definite limitation as to the degree of lateral flexing permitted between the members coupled together. Rohr and Patterson contemplate the use of a pair or series of substantially axially spaced universal joints which while giving a high degree of flexibility is not feasible where the space limitation is extremely critical, such as is usually the case in aircraft assemblies. It has also been found in structures such as the Rohr device, where one of the members forming the universal connection is in effect slidably disposed between a pair of similarly shaped elements, that the member is frictionally engaged on opposite faces by the respective elements creating an undue amount of drag which materially lessens the degree of flexibility of the joint as well as substantially increasing the amount of wear on the intermediate member.

Patterson discloses a sliding joint incorporating substantial clearance to accommodate for the unequal expansion of the slip joint element which are subject to widely divergent temperature conditions. As a consequence, sealing rings of the rubber O-ring type are required to prevent leakage at the axial joint. The result of using such a structure is to create a high degree of drag as the relatively movable parts rub on the O-ring seal, which drag reduces the effectiveness of the axial slip joint, as well as reduces the useful continuous life of the joint due to the thermal hardening and required frequent replacement of the O-rings. Further, Patterson requires the use of an elaborate locking collar for retaining the coupling in its assembled condition which effectively restricts the degree of relative movement of the axial slip joint.

For these and other reasons that will presently appear, flexible couplings presently known do not adequately meet the need for a short coupling having a maximum degree of flexibility for use when space limitations and operating conditions are critical.

An important object of this invention resides in the provision of a short, fluid tight coupling having maximum angular and axial flexibility in confined spaces.

Another object of the invention resides in the provision of a short, fluid tight coupling wherein a pair of universal joints and a slip joint are interconnected for complete coaction.

A further object of this invention is to provide a short, fluid tight coupling wherein packing life is increased because of less relative rubbing movement of the respective parts due to the interaction of the joints.

Yet another object of this invention is to provide a short, fluid tight coupling wherein none of the joints are subject to the direct impingement of a fluid flowing in the coupling.

Still another object of this invention is to provide a short, fluid tight coupling wherein the slip joint and at least one of the universal joints are wholly out of the path of fluid flow.

Still a further object of this invention is to provide a short, fluid tight coupling wherein the sliding joint and universal joints are so located as to expose the entirety of each of the joints respectively to the same degree of temperature so that the respective coacting elements will expand and contract evenly to avoid binding of the joints under all operating conditions.

An additional object of this invention is to provide a short, fluid tight coupling whose configuration is such that there will be an external pressure build up around the various joints thereby lessening the pressure differential between internal and external sides of the joints to minimize leakage.

The and other objects and advantages will appear from the following description and appended claims when read in conjunction with the attached drawings wherein:

Figure 1 is an elevational view of the coupling in an exemplary installation wherein the coupling is shown in solid lines joining an aircraft engine exhaust duct with a heat exchanger unit, both shown by the dot-dash lines;

Figure 2 is a partial longitudinal sectional view of a preferred embodiment of a joint made in accord with this invention showing the coaxially disposed interacting relation of the various joints; and Figure 3 is a longitudinal sectional view of a modified form of multi-action coupling made in accord with this invention.

Referring now to the drawing and particularly to Figure 1 there is shown one of the myriad uses for the short multi-action coupling of the present invention. A conventional aircraft engine mount 20 is secured at one end to the general airplane structure, as indicated at 22 while the opposite end is provided with an engine mounting ring 24. An aircraft engine 26 is flexibly secured to the ring 24 by means of joints 28 which permit axial, lateral, and torsional movement of the engine relative to the general airplane structure. An exhaust collector ring 30 is fixedly secured to the rear side of the engine for receiving the exhaust gases from the cylinders and delivering them to exhaust duct 32 formed on collector ring 30.

By virtue of the flexible joints 28 connecting the engine 26 to mounting ring 24, which is rigidly secured to the airplane, the engine and the integrally mounted collector ring 30 are permitted a degree of relative axial, lateral, and torsional movement with respect to the general airplane structure. The exhaust gases from the collector ring are usually transmitted to another unit such as a heat exchanger 34, or an exhaust turbine which may be connected for driving a supercharger or other auxiliary equipment. The heat exchanger 34, or other unit is usually rigidly attached to the airplane structure with the result that relative movement of the collector ring 30 and exhaust duct 32 takes place with respect to the heat exchanger. For this reason, it is desirable to interconnect these members with a flexible coupling such as that provided by this invention and generally designated 36 to permit the relative axial, lateral, and torsional movement involved while being of such size as to properly function in the extremely limited space available.

Referring now to Figure 2 wherein there is shown the details of a preferred embodiment of the invention, the coupling, generally designated 36 comprises an outer sheet metal shell 38 preferably formed of stainless steel. One end of the shell 38 is of bell formation having an outer convex surface 40 and an inner concave surface 42. The latter surface is preferably plated with a material such as chromium and polished to present a smooth sliding, corrosion resistant surface. The other end of the shell 38 is provided with a peripheral ring 44, secured to the shell as by welding, for abutting engagement with a similar ring on a duct to be coupled in well known manner by an annular V-shaped clamping member (not shown) embracing both rings and holding the shell and duct in coupled relation.

A sheet metal ring 46 is disposed within the bell shaped end of shell 38 and has a convex surface 48 in smooth sliding engagement with the concave surface 42 of shell 38 to coact therewith and form a universal joint. The surface 48 is preferably chrome plated and polished smooth to minimize frictional drag and is provided approximately at its equator with a peripheral outwardly facing groove 50 for receiving a sealing element 52, similar to that shown and described in copending application Serial Number 220,383 filed April 11, 1951, and owned by the assignee of this application. Element 52 prevents the passage of fluid between surfaces 42 and 48 as more fully pointed out in the aforesaid copending application.

The ring 46 is provided adjacent its inner end with a radially inwardly extending annular shoulder 54, the inner peripheral edge of which is disposed at right angles to form an axially extending annular flange 56. The flange 56 is secured, as by weld 58 or the like to a cylindrical member 60 which forms one member of an axial slip joint, the details of which form no part of this invention but are similar to those disclosed and claimed in the U. S. patent to Pitt et al. Number 2,458,635 issued January 11, 1949.

The cylindrical member 60 is provided with a uniform diameter inner surface 62 which is preferably chrome plated and polished to provide a corrosion resistant close fitting yet operable axially reciprocable joint surface under the most highly unfavorable operating conditions with a similarly plated and polished uniform diameter outer surface 64 formed at one end of a second sleeve-like member 66 telescopically disposed within the cylinder 60. The other end portions 61 of the member 66 is of lesser diameter than diameter 64 and is disposed normally axially downstream from flange 56 in order not to interfere with relative sliding of ring 60 on surface 64. End 61 is of bell formation having an outer convex surface 68 and an inner concave surface 70 which is preferably chrome plated and polished in the same manner for the same purposes as concave surface 42.

An inner sleeve-like shell 72 is disposed within the member 66 and one end is of bell formation having an outer convex surface 74, preferably chrome plated and polished for the purposes heretofore pointed out, in coacting engagement with concave surface 70 to form a universal acting ball and socket joint therewith. An equatorial groove 76 is formed in the periphery of the convex surface 74 for receiving a sealing element 78, similar to sealing element 52, for inhibiting any fluid flow between surfaces 70 and 74. A peripheral ring 80, similar to and for the same purpose as ring 44, is secured to the peripheral end of the inner shell remote from the bell formation.

As illustrated in Figure 2, the ball and socket joint of the outer shell formed by coacting surfaces 42 and 48 is located adjacent the attaching ring 80 of the inner shell, while the ball and socket joint joined by coacting surfaces 70 and 74 of the inner shell is disposed adjacent the attaching ring 44, and the axial slip joint formed by coacting surfaces 62 and 64 is disposed between the aforementioned ball and socket joints. As a result of this arrangement, a coupling is provided embodying a maximum degree of flexibility with a minimum overall length. By virtue of this configuration and arrangement it will also be noted that both ball and socket joints and the intermediate slip joint are respectively exposed to the same degree of temperature. That is the elements forming surfaces 42 and 48 of the outer ball and socket joint and the elements forming surfaces 62 and 64 of the axial slip joint are primarily exposed to atmospheric temperature and the cooling effects of the external circulating air. As a result of having both elements of the two joints so exposed a more uniform expansion and contraction is assured thereby avoiding binding or freezing of the joint and thus permitting maximum uniform flexibility under all operating conditions. The inner ball and socket formed by coacting surfaces 70 and 74 is disposed wholly within the coupling with the result that this joint is exposed to the temperature of the fluid flowing within the coupling. Thus uniformity of expansion and contraction and consequent uniform flexibility of this joint under all operating conditions is also assured.

The embodiment disclosed in Figure 2 is of particular value when used in closed systems such as are located between aircraft engines and heat exchangers, although it is not limited to such use. In such installations there may be as much as 12 pounds per square inch differential between the internal and external pressures, particularly as the external pressure drops off with an increase in altitude of the aircraft. As a result of the greater pressure within the coupling there is a possibility of considerable leakage of the fluid. In an installation such as that of Figure 2 the coupling will be exposed to the engine cooling air or slip stream generally designated by arrow A flowing in the same direction as the exhaust gases. Such flowing air will be forced into the pocket generally designated P and result in somewhat of a pressure build up in this pocket which will tend to lessen the differential between the internal and external pressure and consequently materially lessen the leakage past the axial slip joint and the ball joints. In addition, by virtue of the nozzle action of inner shell 72, the flow of fluid indicated by lines F is directed inwardly immediately down stream of the inner shell 72 and then it finally expands outwardly to level off and follow the enlarged diameter of the down stream wall of shell 38. This pattern of flow produces a low pressure area V immediately down stream of the inner ball and socket formed by surfaces 70 and 74 with the result that there is an aspirating effect on the fluid in the annular space T so that pressure in this area is lessened which consequently reduces the differential between internal and external pressures at the joints and further materially lessens if not totally eliminating fluid leakage past the various joints.

Referring now to Figure 3 there is shown a modified form of short coupling wherein the differential between the internal and external pressures is similarly reduced but not quite as effectively as in the form of invention shown in Figure 2.

An outer shell 82 is provided with a bell formation at one end having a concave surface 84 in coacting engagement with convex surface 86 of a ring member 88 to form a universal joint therewith. The engaging surfaces are preferably chrome plated and polished as heretofore pointed out in connection with Figure 2. A sealing element 90, similar to seal 52, is disposed in an equatorial groove 92 in ring 88 between the surfaces 84 and 86 to inhibit fluid leakage therebetween. A peripheral ring 94 is secured to the cylindrical end of shell 82 remote from the ball formation to adapt the shell for connection to one of the members to be coupled.

The ring 88 is provided with an inwardly extending annular shoulder 96 terminating in an axially extending annular flange 98 disposed at right angles to shoulder 96 and connected to an end portion of a connecting member 100 as by weld 102. The other end of the connecting member 100 is secured to a cylindrical ring 104 as by weld 106. A smoth uniform inner diameter 108 on the ring 104 is in coacting sliding engagement with a similarly uniform outer diameter 110 on an inner socket member 112 to form an axially reciprocable sealing joint therewith. One end of the inner socket member 112 is of bell formation and has a concave surface 114 in coacting engagement with a convex surface 116 on an inner shell member 118, to form a universal joint therewith. A seal 120 is disposed in an equatorial groove 122 in shell 118 between surfaces 114 and 118 to prevent the leakage of fluid between these surfaces. A peripheral ring 124 is mounted on the cylindrical end of shell 118 remote from the bell formation to facilitate connection of the shell 118 to the other member desired to be coupled.

The embodiment shown in Figure 3 also has a pocket P into which relatively flowing external air can be compacted thereby reducing the differential between internal and external pressures with the result that leakage past the axially reciprocable joint is substantially eliminated since there is in effect a materially lesser pressure tending to force fluid outwardly past the joints.

The fluid flow F passing from the smaller inner shell 112 to the larger diameter outer shell 82 also forms a low pressure pocket L at the point where the diameters change. This loss of pressure head is not only due to friction of the flowing fluid, but also in part to the abnormal condition in the area designated L, involving curvilinear motions of the fluid in the expanding stream and a viscous drag of the flowing fluid on the eddying mass in the corner thus creating a low pressure area.

This low pressure area L will have an aspirating effect on any fluid in the annular spaces and will also tend to lessen the differential between internal and external pressure which will aid in preventing leakage at the joints.

In both embodiments of the invention shown, a maximum degree of flexibility for the coupling is attained because of the concentric relation of the universal joints that interact with each other by virtue of their mutual close connection to the intermediately disposed axially reciprocable joint.

It has been found in practice that flexible couplings made in accordance with the present invention provide a practical solution to the hitherto unanswered problem of providing a simple, effective, universally flexible coupling for confined spaces between two relatively movable elements for carrying a fluid from one of the elements to the other.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:

1. A short coupled sliding, universal joint, fluid transmitting duct coupling comprising a pair of shell-like ball and socket members of substantially different diameter disposed in partial telescoping radially spaced relation to one another and each including an axially but oppositely extending cylindrical portion adapted for leakproof connection to a pair of axially spaced relatively movable duct members, and a slip joint interconnecting said radially spaced ball and socket members and disposed in the annular space defined by the overlapping portions of said ball and socket members and adapted to form a sealing partition extending radially across said annular space between said ball and socket members.

2. The combination defined in claim 1 wherein said outermost ball and socket member extends axially beyond said sealing partition toward said cylindrical connecting portion of said inner ball and socket member and cooperates with said inner ball and socket member to form an annular pocket opening axially to the atmosphere and adapts said coupling for operative connection in an internal combustion engine exhaust duct system with said pocket opening disposed to receive a portion of the slip stream cooling air flowing along said duct system whereby impacting of said slip stream air in said pocket serves to partially neutralize the internal-external pressure differential to which such couplings are normally exposed and minimize fluid leakage through said joints to the surrounding atmosphere.

3. The combination defined in claim 1 wherein said innermost ball and socket member extends axially beyond said sealing partition toward said cylindrical connecting portion of said outer ball and socket member and cooperates with said outer ball and socket member to form an annular space surrounding said inner member and opening axially to the interior of said outer ball and socket member and adapts said coupling for operative connection in a fluid duct system with said innermost ball and socket member connected to the upstream end of said duct system whereby normal flow of fluid downstream in said duct system will discharge out of said inner ball and socket member and create an aspirating effect in said annular space serving to maintain the fluid pressure in said annular space lower than that in other interior areas of said coupling to partially neutralize the internal-external pressure differential to which such couplings are normally exposed and minimize fluid leakage through said joints to the surrounding atmosphere.

4. A multi-action short coupling for use as a flexible conduit in confined spaces comprising; a first socket member in coacting engagement with a first ball member forming a universal action first ball and socket joint, a second socket member spaced radially inwardly of said first ball and socket joint in coacting engagement with a second ball member forming a universal action second ball and socket joint, axially reciprocable sealing means interconnecting said first and second ball and socket joints and forming a substantially unitary conduit for a fluid to flow therethrough whereby said first and second ball and sockets are capable of relative axial movement in addition to their respective universal actions, and packing means disposed between respective coacting ball and sockets to inhibit external leakage of any fluid flowing in the conduit.

5. A multi-action short coupling providing a flexible conduit for use in a limited space between first and second elements subject to independent relative motion comprising; a pair of substantially coaxially disposed radially spaced ball and socket joints; one member of the innermost joint having an end adapted for leakproof attachment to the first element; one member of the outermost joint having an end adapted for leakproof attachment to the second element; an axially reciprocable sealing joint interconnecting the other members of each of the joints whereby said ball and socket joints and reciprocable joint cooperate to permit unrestrained relative angular and axial movement of said first and second elements, and packing means between respective ball and sockets to provide a leakproof conduit for a fluid flowing from said first element to said element.

6. A multi-action short coupling for use as a flexible couple comprising; coaxially disposed radially spaced first and second socket members, means interconnecting said first and second socket members engaging said first socket member and forming a universal action first ball and socket joint therewith and engaging a portion on said second socket member in axially reciprocable sealing relation whereby said first and second sockets are capable of relative angular and axial movement, a ball member in coacting engagement with said second socket forming a universal action second ball and socket joint, said first socket and said ball member having ends for leakproof attachment to first and second elements respectively forming a conduit therebetween for a high pressure fluid flowing from one of said elements to the other of said elements, and packing means intermediate respective ball and sockets to provide fluid tight seals inhibiting exterior leakage of the fluid flowing in the conduit from one of said elements to the other of said elements.

7. The device as set forth in claim 6 wherein said first ball and socket joint is disposed wholly out of the path of the fluid flowing in the conduit and is substantially wholly exposed to cooler atmospheric temperature.

8. The device as set forth in claim 6 wherein said first ball and socket joint and said second ball and socket joint form an open ended pocket therebetween whereby relatively moving external air will be compacted in said pocket and build up a pressure in the pocket thereby lessening the differential between internal and external pressures and materially lessening the pressure tending to force the fluid externally between said means and said second socket member, and between said first ball and socket joint.

9. A flexible multi-action coupling comprising, a substantially short outer shell having one end of generally spherical configuration, a sealing element having a first portion of generally spherical shape engaging and forming a coacting ball and socket with the spherical portion of said shell for relative universal action between said outer shell and said portion, an inner shell disposed in spaced relation within said outer shell and having one end of generally spherical contour engaging and forming a coacting ball and socket joint with a second spherical portion on said sealing element for relative universal action between said inner shell and said second portion, said sealing element having a longitudinally reciprocable slip joint intermediate said first and second spherical portions allowing relative axial movement of said outer and inner shells with respect to each other, packing means disposed between each one of said ball and sockets to provide a fluid tight seal therebetween, and a free end on each of said shells for flexibly coupling a pair of independently mounted units together so that a high temperature high pressure fluid can pass from one unit to the other with no apparent fluid leakage therefrom.

10. A flexible multi-action coupling comprising short coextensive inner and outer shells in radially spaced relation having an opposite end of each in leakproof attachment with a first and second element respectively to provide a conduit for high temperature high pressure fluid flowing from one of said elements to the other of said elements and an opposite end of each in unattached relation to said elements adjacent the attached end of the other shell, a pair of members in axially sliding sealing contact under all conditions of operation disposed wholly between said shells out of the path of the high temperature fluid and substantially wholly exposed to the cooling effects of cooler exterior atmospheric temperature, each of said members having an oppositely extending portion engaging an unattached end of one of said shells, said unattached end of said outer shell being of socket formation coacting with a ball formation on the portion in engagement therewith forming a first universal joint therebetween, and said unattached end of said inner shell being of ball formation coacting with a socket formation on the portion in engagement therewith forming a second universal joint whereby said shells can freely flex relative to each other upon any relative angular vibratory movement of said first and second elements, and packing means disposed between each of said portions and unattached ends inhibiting exterior leakage of the fluid flowing from one of said elements to the other of said elements.

11. The device as set forth in claim 10 wherein an open end pocket is formed between said first and second universal joints permitting relatively moving external air to enter said pocket and build up a pressure therein lessening the differential between internal and external pressures thereby materially lessening the pressure tending to force the fluid externally between said pair of members and between said ball and socket forming said second universal joint.

12. The device as set forth in claim 10 wherein the ball and socket joint of one of said portions and the outer shell is disposed wholly out of the path of flow of the high temperature fluid and is substantially wholly exposed to the cooling effects of the relatively cooler atmospheric temperature thereby preventing binding of the ball and socket because of uneven expansion resulting from exposure of one portion of the joint to a different degree of heat than the other portion of said joint.

13. The device as set forth in claim 10 wherein the ball and socket joint between one of said portions and the inner shell is wholly disposed in the path of flow of the high temperature fluid exposing both the ball and socket to the same degree of heat to allow said ball and socket to expand evenly and thereby prevent any binding.

14. The device as set forth in claim 10 wherein the ball formation on the portion engaging the outer shell and the ball formation on the inner shell are provided with equatorial grooves each receiving a packing therein to cooperate with the respective ball and socket and inhibit exterior leakage of the high temperature high pressure fluid flowing within said shells from one of said elements to the other of said elements.

References Cited in the file of this patent

UNITED STATES PATENTS

| Number | Name | Date |
| --- | --- | --- |
| 1,095,926 | Powell | May 5, 1914 |
| 1,153,187 | Berry | Sept. 14, 1915 |
| 2,381,426 | Allen et al. | Aug. 7, 1945 |